(12) United States Patent
Cornell et al.

(10) Patent No.: US 9,712,418 B2
(45) Date of Patent: Jul. 18, 2017

(54) AUTOMATED NETWORK CONTROL

(71) Applicant: Microsoft Technology Licensing, LLC, Redmond, WA (US)

(72) Inventors: Daniel R. Cornell, Sammamish, WA (US); William T. Boyd, Kirkland, WA (US); Raymond Keith Linz, Duvall, WA (US); Karin Meier-Magruder, Bellevue, WA (US); Bennett L. Warriner, Mercer Island, WA (US); David S. Riley, Issaquah, WA (US); Charles McDaniels, III, Renton, WA (US); George K. Ringer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 14/722,006

(22) Filed: May 26, 2015

(65) Prior Publication Data

US 2016/0352608 A1    Dec. 1, 2016

(51) Int. Cl.
*G06F 15/173* (2006.01)
*H04L 12/26* (2006.01)
(Continued)

(52) U.S. Cl.
CPC ......... *H04L 43/10* (2013.01); *G06Q 10/0633* (2013.01); *G06Q 10/10* (2013.01); *H04L 43/0817* (2013.01)

(58) Field of Classification Search
USPC ........................................ 709/224, 229, 200
See application file for complete search history.

(56) References Cited

U.S. PATENT DOCUMENTS 5,276,440 A    1/1994  Jolissaint et al.
7,274,305 B1 *  9/2007 Luttrell .................... B61L 1/20
                                                      324/141
(Continued)

FOREIGN PATENT DOCUMENTS

WO    2011046559 A1    4/2011

OTHER PUBLICATIONS

"Network Configuration Manager—Automated Network Configuration & Change Management Software", Retrieved on: Sep. 10, 2014 Available at: http://www.solarwinds.com/network-configuration-manager.aspx.
(Continued)

*Primary Examiner* — El Hadji Sall
(74) *Attorney, Agent, or Firm* — Workman Nydegger

(57) ABSTRACT

Embodiments are directed to automatically controlling network and service quality across datacenters. In one scenario, a computer system identifies portions of work that are to be performed within the datacenter. The computer system creates a request for change (request) in a change management system, where the change management system is configured to store and manage the implementation of requests within the datacenter. Then, upon implementation of the created request, the computer system polls the status of the request to determine whether the portions of work identified in the request can now be performed and, upon determining that the portions of work identified in the request can be performed, the computer system performs the portions of work according to the request. Performance of the specified work according to a request allows for workflows to be controlled based on the request.

20 Claims, 10 Drawing Sheets

(51) Int. Cl.
*G06Q 10/06* (2012.01)
*G06Q 10/10* (2012.01)

(56) References Cited

U.S. PATENT DOCUMENTS

| | | | |
|---|---|---|---|
| 7,307,979 | B2 | 12/2007 | Visser |
| 8,214,494 | B1 | 7/2012 | Slavin |
| 8,370,479 | B2 | 2/2013 | Hart et al. |
| 2007/0083588 | A1 | 4/2007 | Keller et al. |
| 2013/0036422 | A1 | 2/2013 | Rao et al. |
| 2013/0055247 | A1* | 2/2013 | Hiltgen .............. G06F 8/60 718/1 |
| 2015/0243058 | A1* | 8/2015 | Cook .............. G06T 11/206 345/419 |

OTHER PUBLICATIONS

"Network Performance Monitor v11", Retrieved on: Sep. 10, 2014 Available at: http://www.solarwinds.com/network-performance-monitor.aspx.

"AVG Managed Workplace", Published on: Jul. 13, 2013 Available at: http://www.levelplatforms.com/product/whats-new-MW-2013.aspx.

"Local Traffic Manager", Published on: Mar. 30, 2014 Available at: https://f5.com/products/modules/local-traffic-manager.

Gunawi, et al., "Failure as a Service (FaaS): A Cloud Service for Large-Scale, Online Failure Drills", In Technical Report No. UCB/EECS-2011-87, Jul. 28, 2011, 10 pages.

"DeviceExpert—Network Configuration Management Software", Retrieved on: Sep. 10, 2014 Available at: http://www.manageengine.com/products/device-expert/.

"F5 Technologies", Published on: Mar. 30, 2014 Available at: https://f5.com/products/technologies.

"Network management shouldn't be tedious—Hewlett-Packard", Retrieved on: Sep. 10, 2014 Available at: http://h20195.www2.hp.com/V2/GetPDF.aspx%2F4AA1-5784ENW.pdf.

International Search Report and Written Opinion for PCT Application No. PCT/US2016/033389, mailed Jul. 15, 2016.

"Second Written Opinion Issued in PCT Application No. PCT/US2016/033389", Mailed Date: Apr. 20, 2017, 6 Pages.

* cited by examiner

AUTOMATED NETWORK CONTROL

BACKGROUND

Today's datacenters include many different networking, processing and other devices. These devices need to be automatically monitored, patched and tested. The redundancy of these devices is also managed to ensure that failovers occur automatically.

BRIEF SUMMARY

Embodiments described herein are directed to automatically controlling network and service delivery across datacenters. In one embodiment, a computer system identifies a task that is to be performed within a datacenter and creates a request for change that includes an indication of the identified task, where the request is stored and managed by a change manager. Then, upon creating the request, the computer system monitors processing of the created request. The monitoring results in telemetry data which is analyzed to identify unexpected events related to the processing of the task identified in the request.

Then, upon identifying at least one unexpected event, the computer system stores a second request for change generated to address the unexpected event. This process ensures that datacenter devices can perform needed tasks when unexpected events occur. This ability to automatically and gracefully respond to failures or other unexpected events leads to increased datacenter reliability. Examples of datacenter tasks that may be automatically performed include, but are not limited to, patching or performing software upgrades, rebooting a device, powering down a device, uninstalling components, implementing configuration changes, controlling or redirecting the flow of network traffic, assessing and changing processor utilization rates, performing data collection including gathering telemetry data such as performance data, counters from servers, aggregate server logs, event logs, etc., or performing process dumps for low level debugging (e.g. collection of trace information). Many other tasks may be performed by the computer system, as will be explained below.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
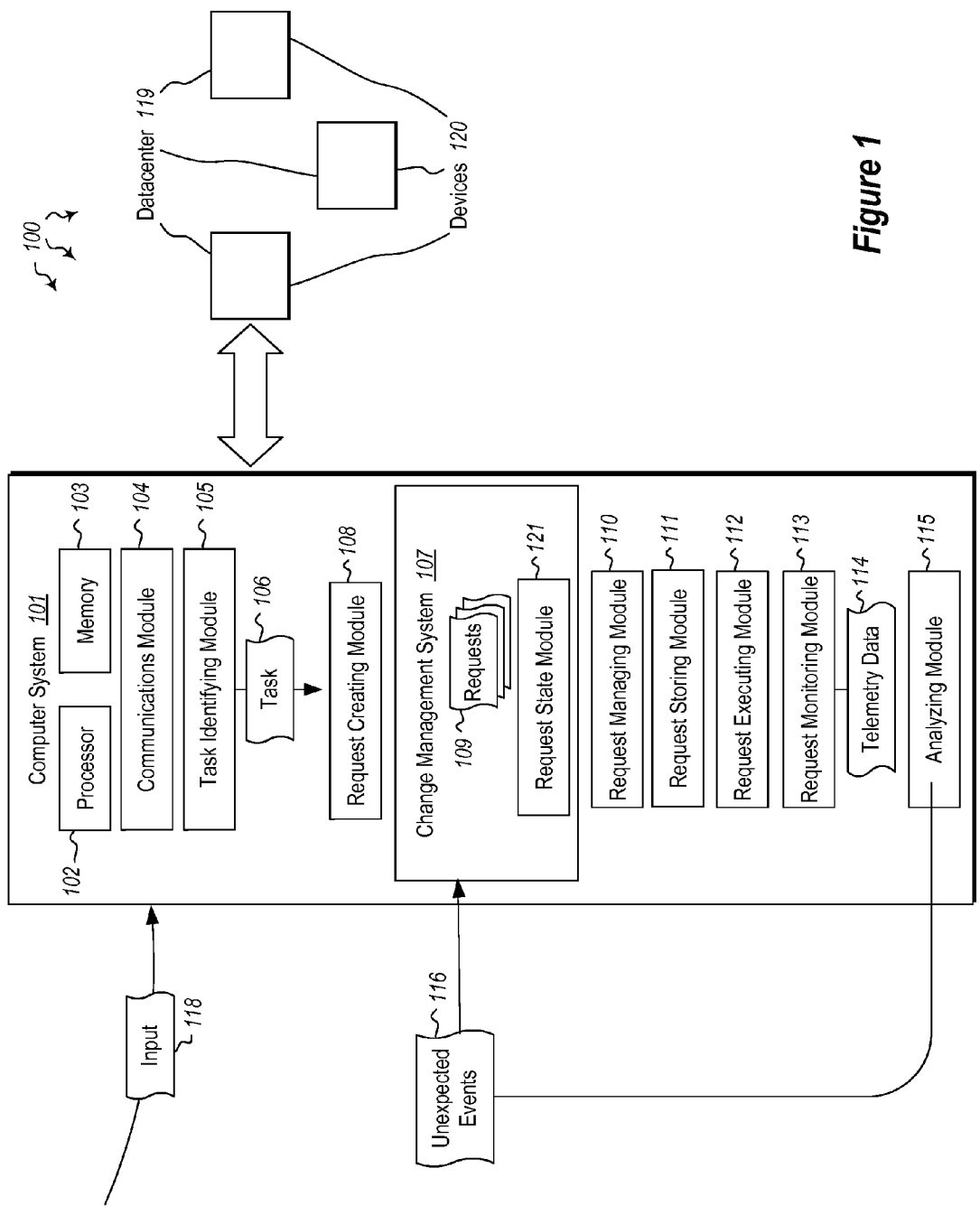
FIG. 1 illustrates a computer architecture in which embodiments described herein may operate including automatically controlling network and service delivery across datacenters.

Embodiments described herein are directed to automatically controlling network and service delivery across datacenters. In one embodiment, a computer system identifies a task that is to be performed within a datacenter and creates a request for change that includes an indication of the identified task, where the request is stored and managed by a change manager. Then, upon creating the request, the computer system monitors processing of the created request. The monitoring results in telemetry data which is analyzed to identify unexpected events related to the processing of the task identified in the request.

Then, upon identifying at least one unexpected event, the computer system stores a second request for change generated to address the unexpected event. This process ensures that datacenter devices can perform needed tasks when unexpected events occur. This ability to automatically and gracefully respond to failures or other unexpected events leads to increased datacenter reliability because errors or unexpected events may be responded to in real time. Still further, by processing unexpected errors automatically soon after they occur, downstream errors may be avoided which leads to further error reduction, greater data center efficiency and increased overall reliability and availability.

Examples of datacenter tasks that may be automatically performed include, but are not limited to, patching or performing software upgrades, rebooting a device, powering down a device, uninstalling components, implementing configuration changes, controlling or redirecting the flow of network traffic, assessing and changing processor utilization rates, performing data collection including gathering telemetry data such as performance data, counters from servers, aggregate server logs, event logs, etc., or performing process dumps for low level debugging (e.g. collection of trace information). Many other tasks may be performed by the computer system, as will be explained below.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The communications module 104 may further be configured to receive input 118. The input 118 may indicate that certain tasks are to be initiated, or that request data is to be generated, or that certain automated requests are to be started, stopped or paused. Indeed, the input 118 may have a variety of different meanings and uses depending on context. The computer system 101 further includes a task identifying module 105. The task identifying module 105 may be in communication with devices 120 of the datacenter 119, and may use various methods to identify automated tasks 106 that are to be performed. The datacenter 119 may include many different types of devices 120 including networking devices, storage devices, processors, memory, server racks or other types of hardware. The automated tasks 106 may include, for example, upgrading software on device nodes with updated software, rebooting devices, automatically powering down devices, or any other automated task that may need to be performed.

The automated task data 106 may be input into a change management system 107. The change management system 107 may be responsible for controlling and monitoring changes made to a datacenter's devices 120. Other modules may be accessed by the change management system 107 to monitor and control the automatic implementation of requests including the request managing module 110, the request storing module 111, the request executing module 112, the request monitoring module 113 and an analyzing module 115 which may be used to analyze telemetry data 114 gathered from the devices of the datacenter 119. The request state module 121 may store and/or provide the state of requests 109 to querying entities. It should be noted that each of these request modules may be contained locally within the computer system 101, or may be part of another computer system.

Figure 2:
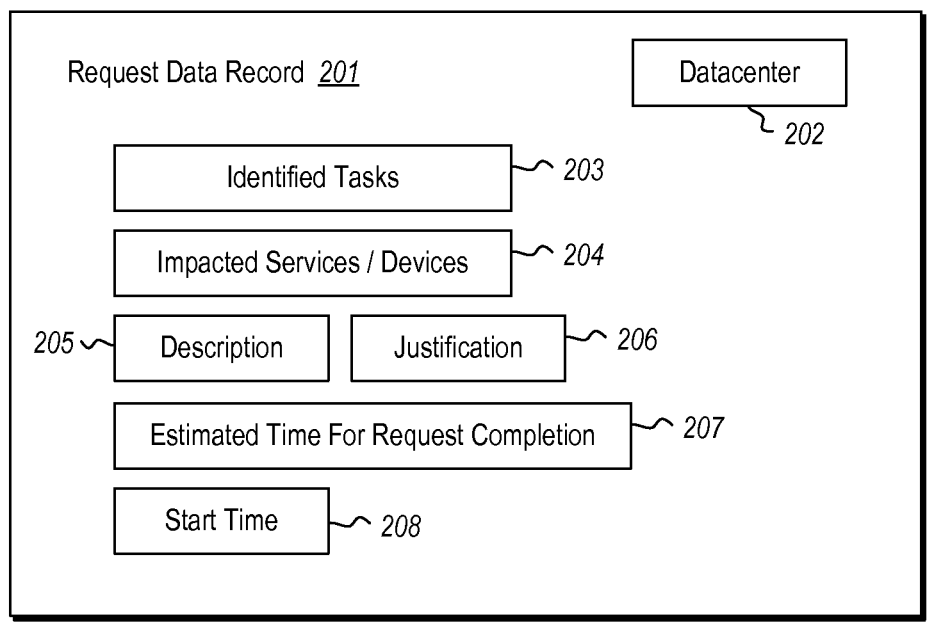
FIG. 2 illustrates an embodiment of a request data record including a plurality of fields.

The request itself (109) may be referred to as a request for change or a request data record or simply a request. As shown in FIG. 2, a request data record 201 may include different types of information about the request. The request 201 may include a datacenter identifier 202 that identifies the datacenter(s) to which the request applies. For instance, if the request is specific to the devices, software or services in one datacenter, the datacenter ID may be specific to that datacenter. The request data record 201 may also include an indication of tasks 203 that have been identified by the task identifying module 105. These tasks may be automated tasks that are automatically performed, for example, upon determining that a datacenter device is to be updated or rebooted or reconfigured.

Indeed, the tasks 106 identified by module 105 that may be automatically performed include, but are not limited to, patching or performing software upgrades, rebooting a device, powering down a device, uninstalling components, implementing configuration changes, controlling or redirecting the flow of network traffic, assessing and changing processor utilization rates, performing data collection including gathering telemetry data such as performance data, counters from servers, aggregate server logs, event logs, etc., performing process dumps for low level debugging (e.g. collection of trace information), or information regarding other tasks which may be automatically performed within a datacenter.

Returning to FIG. 2, the request data record 201 may further include an indication of impacted services or devices. These are the services or devices that would be impacted upon implementation of one or more of the identified tasks 203. The request data record 201 may include a description 205 of the tasks to be performed, as well as a justification 206 for their performance. For instance, the performance of some tasks such as upgrading or rebooting may result in down time which may need to have a certain level of justification in order for it to be performed. The request data record 201 may also include an estimated time for completion 207 of the identified task(s) 203 and a proposed or scheduled start time. The start time 208 may be calculated upon first checking the change management system 107. If the change management system 107 is in a locked down mode, the start time will be delayed. If the change management system 107 is not in a locked down mode, an estimated duration will be calculated for the task, and a start time will be generated based on the estimated duration of the task.

In a large scale service, there are typically many devices of varying types which have different command sets that are to be managed, monitored, patched, and tested. The redundancy of a given datacenter design may be routinely tested to confirm its operation and identify issues that may prevent a seamless failover between these datacenter devices 120. This process may also include verifying that datacenter monitoring correctly detects issues, measures the resolution, and that the design is implemented correctly. Embodiments described herein perform these functions in an automated fashion, integrated and controlled by a change management system 107 in a visible and trackable way.

Indeed, embodiments described herein may perform many different functions including, but not limited to, the following: embodiments may integrate with the change management system 107 as the user control interface and allow for tracking what the automation is doing, and further calculate estimated duration. Embodiments may adhere to the lockdown dates configured in the change management system 107. The tasks 106 that are to be performed may be controlled by a request for change or "request" herein. The request 109 may include one or more specific tasks that are to be performed as part of the request. The list of tasks may then be controlled by controlling the request. That is, when a request starts, stops, is paused, or canceled, the change management system takes the associated action automatically. If a non-recoverable failure is detected at any point, the automatic performance of the tasks 106 will stop processing additional items and send notifications via any combination of email, text message, auto-page, incident ticket, or other notification method.

Embodiments further provide the ability to migrate and move network traffic between devices using a local script on the network devices. A "chaos" mode may be implemented to proactively test fault tolerant network designs by causing failures, measuring the level of impact, and generating and storing bug data when services fail to handle the failure. Embodiments also provide the ability to understand different device roles and role group health, confirm device states, compare configurations before and after changes to ensure that health and network functionality has been restored, and correlate events that occurred in the service by pulling alert data from other systems. Automated configuration backup may be used for automated rollback if needed. In some cases, alerts may be suppressed during "safe" maintenance for devices and servers related to the particular device that is currently undergoing maintenance.

Still further, embodiments allow running of scripts or services on network devices to facilitate network and service control. Workflow engines may be configurable in real time, allowing adjustment of the number of concurrent device groups, and the number of devices in each group. Embodiments also provide the ability to run control commands using a secure shell protocol (or some other protocol) and exposed application programming interfaces (APIs).

Thus, as mentioned above, processes may be implemented to automatically search for and identify tasks that need to be executed. These processes automatically execute maintenance work such as patching, and can also optionally perform "chaos" mode tasks to test the redundancy of the datacenter architecture that is designed for fault tolerance. The processes manage simultaneous tasks and ensure there are no overlapping tasks for the same datacenter devices.

Regardless of the mode of operation (i.e. "chaos" or "safe"), the process identifies tasks 106 and automatically generates and logs requests for automated work. While in the running state, the change management system may serve as the user interface for controlling the automation. Start, stop, pause, and cancel commands are respected and picked up by the process, and the corresponding action is taken within the automation.

While performing maintenance, the process may operate in a "safe" mode attempting to avoid impact to datacenter data paths. Datacenter devices 120 are tested before and after the maintenance. Comparisons may be performed to ensure configurations, routing tables, and interfaces match the correct operational state (as stored in the request state module 121. Neighboring devices may also be tested prior to maintenance to validate their state and capability to handle existing network traffic before the task 106 is performed. Where the network design supports it, special network device side scripts may be implemented to perform a graceful failover to the neighboring device(s) or reroute network traffic.

When operating in "chaos" mode, the process does not perform graceful transitions and, in contrast, intentionally tests failure scenarios in the datacenter design. Under proper conditions, all datacenter devices should be resilient to failures. During the test, impact of the simulated device failure is also monitored and data is collected. An active alert for the injected failure is confirmed in the monitoring and ticketing system. Related alerts are also correlated. The duration of the detected failure, time to alert, and time to resolution may all be measured, recorded, and matched against service level agreements (SLAs). Any deviations will stop the currently running task and trigger an investigation and a root cause analysis. Additional notifications can be sent via ticketing, bug, task, automated page, text message, or email.

Because the process understands each device role, it can determine which steps should be taken in each of the two modes. For example, in "safe" mode it understands that traffic needs to be rerouted to a neighboring device, that draining needs to occur, and that certain health and/or state checks need to be performed for each device role. In "chaos" mode, the process uses this same relationship data to monitor partner devices, check performance, and connection impact on the remaining neighboring devices participating in the role. The work being performed is recorded and can be queried through various interfaces. Because the process is performing known tasks, it also has the option of suppressing or acknowledging alerts that are being generated by related devices and servers. This allows for a noise free operation especially when performing maintenance.

In some cases, the task identifying module 105 may identify one or more tasks 106 that are to be performed within the datacenter 119. As mentioned above, the tasks may include upgrading hardware components, firmware components or software applications on any of the devices 120 of the datacenter 119. For instance, the components or applications may be upgraded from older versions to newer versions. Other tasks may include rebooting devices, bringing nodes down for maintenance or performing other tasks. The datacenter devices 120 may include networking devices such as routers, load balancers, firewalls and network cards. The datacenter devices 120 may also include processing devices such as CPUs, GPUs and microcontrollers. Still further, the datacenter devices 120 may include storage devices such as hard drives, optical drives, storage networks or any other device that is part of or may be used in a datacenter.

The request creating module of computer system 101 may create a request 109 for the identified tasks 106. The request 106 may be stored by the request storing module 111 along with other previously generated requests 109. The request creating module 108 may be one of many components that is part of a change management system 107 or "change manager". At least in some embodiments, the change management system 107 may be responsible for creating, storing, managing, executing and monitoring requests. In some embodiments, the change management system 107 may also be responsible for analyzing telemetry or other data to identify the occurrence of unexpected events 116.

Upon implementation of the created request 109, the request managing module 110 may be configured to poll the status of the request to determine whether the tasks identified in the request can be performed. Then, upon determining that the identified tasks 106 can be performed, the tasks are performed according to the request. Thus, for example, once the request managing module 110 determines that the request can be performed (e.g. because it has been approved or because a preceding condition has been fulfilled), the request executing module 112 may then execute the tasks of the request within the datacenter 119. In this manner, requests ensure that changes made to the datacenter are known and approved before implementation.

In some embodiments, an automation workflow may be initiated (e.g. by workflow engine 501 of FIG. 5 as discussed below) that automatically performs the portions of work specified by the request. This automation workflow may be controlled using the request. For instance, tasks 106 specified in the request 109 may be performed or not performed based on the status of the request. If, for example, the status of the request is approved and operating, the identified task 106 may be performed. On the other hand, if the status of the request is stopped, paused or canceled, the identified task 106 will not be performed. In this manner, the performance of datacenter tasks may be controlled by changing the status of the request 109.

The request monitoring module 113 may continuously monitor the execution of many different requests within the datacenter 119. In some case, the request monitoring module may automatically detect that performance of at least one of the tasks has failed and, as such, may stop or pause the request so that performance of the tasks according to the request will be stopped or paused. Thus, the request monitoring module 113 of the change management system may also be capable of changing the operating status of an request from executing to stopped, paused or canceled in light of an execution failure.

As indicated above, tasks may be performed in various modes including "chaos" mode or "safe" mode. When tasks are performed according to the request in safe mode, impactful changes are prevented from taking place. As such, the system is highly likely to continue operating as normal without experiencing a failure due to the tasks being performed, as the tasks are not impacting tasks (i.e. tasks that would impact critical systems). On the other hand, the tasks of the request may be performed in a chaos mode or "impactful" mode that does allow impactful changes to occur, or even identifies and processes request tasks that are specifically known to be impactful. This may be done to test the resiliency of the datacenter components to determine whether they actually failover according to policy or not.

Some embodiments may be configured to instantiate software functionality on various datacenter devices. This functionality may be configured to divert network traffic off of those datacenter devices and onto other datacenter devices. For instance, networking devices such as routers or load balancers may be configured to instantiate a script on a networking device that diverts network traffic off of that router or load balancer and onto another device. Any tasks performed during execution of a request may be monitored by the request monitoring module 113. Reports of the operating status may be sent to the user 117 or to other entities as per policy. The monitoring may result in telemetry data that is associated with the performance of the task. This telemetry data may then be used to discover other tasks that are to be performed within the datacenter 119. These concepts will be explained below with regard to Method 300 of FIG. 3.

Figure 3:
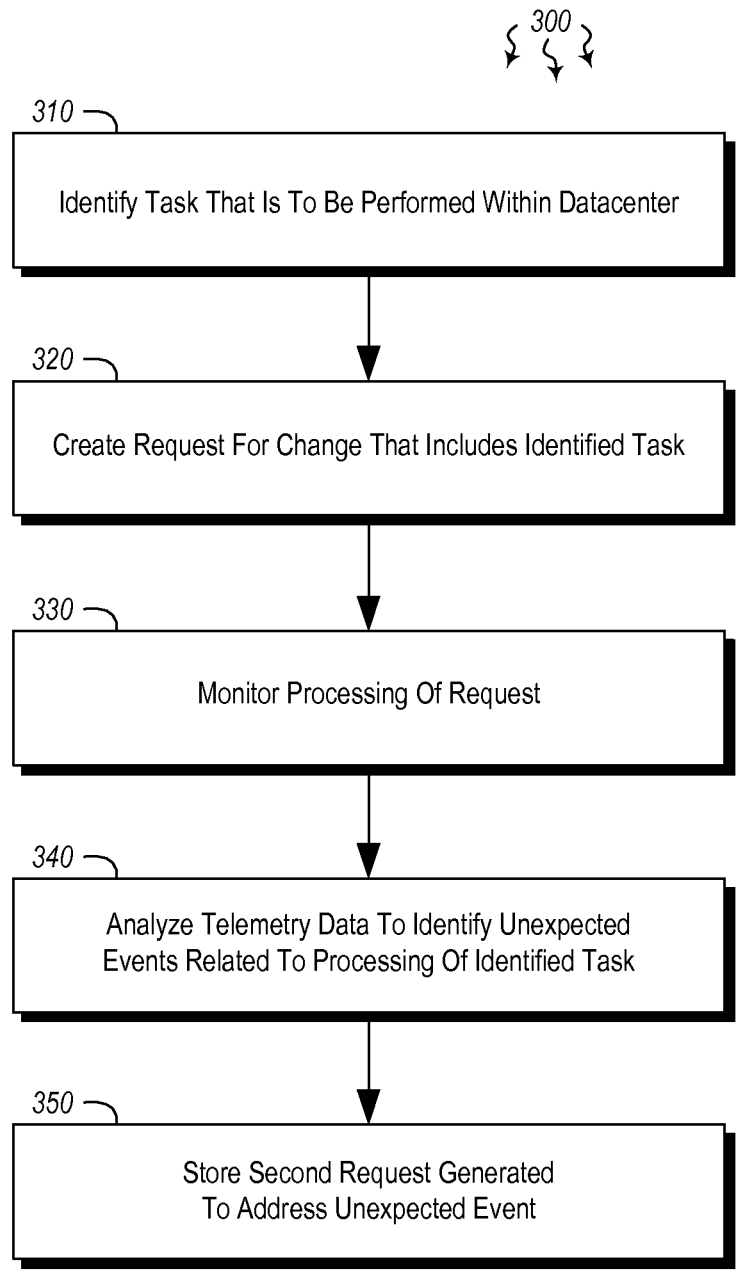
FIG. 3 illustrates a flowchart of an alternative example method for automatically controlling network and services across one or more datacenters.

In view of the systems and architectures described above, methodologies that may be implemented in accordance with the disclosed subject matter will be better appreciated with reference to the flow chart of FIG. 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Turning now to FIG. 3, a flowchart is illustrated of a method 300 for automatically controlling network and service quality within a datacenter. The method 300 will now be described with frequent reference to the components and data of environment 100.

Method 300 includes identifying one or more tasks that are to be performed within the datacenter (310). For example, the task identifying module 105 of computer system 101 may identify work 106 that is to be performed within datacenter 119. Method 300 next includes creating a request for change (request) that includes an indication of the identified task, where the request 109 is stored and managed by a change manager 107 (320). Upon creating the request 109, the request monitoring module 113 monitors processing of the created request, and this monitoring results in one or more portions of telemetry data 114 (330).

The method 300 further includes analyzing the telemetry data to identify one or more unexpected events related to the processing of the task identified in the request (340). The telemetry data may include many different types of information about the performance of a given task and may thus shed light on any unexpected events related to the processing of the task 106. The telemetry data may include, for example, inspection of alert log data, inspection of device status data, inspection of network traffic performance data, time to alert, time to resolution, time to power up device, time to same performance of data or response time to fix.

If the analyzing module 115, upon analyzing the telemetry data 114, identifies at least one unexpected event, automatically creates and stores a second request for change generated to address the unexpected event (350). The second request for change may include specific tasks 106 that, when processed, handle or resolve the unexpected event. Thus, for instance, if the unexpected event is that a server failed to upgrade, the identified task may be to reboot the server and attempt the upgrade again. Each step of the task would be performed automatically without human intervention.

For example, the monitoring module 113 may monitor the execution of one or more requests that are being processed in a datacenter 119. The monitoring may produce telemetry data 114 which can be used to identify unexpected events related to the processing of the request. The analyzing module 115 of the change management system 107 may be configured to analyze this telemetry data 114 to identify the unexpected events 116. The unexpected events may be identified by comparing the telemetry data indicating what did occur to an indication of expected events that was generated prior to implementation of the request. Unexpected events may include, for example, a server not booting up after being rebooted, or a software upgrade taking much longer than expected, or a server crashing during an upgrade, or experiencing a hardware failure, or any number of other problems that may occur when performing a task within a datacenter.

When such unexpected events occur, the request monitoring module 113 may report these events and may provide an indication of such events to a ticketing service or other entity. The ticketing service can then be used to generate a follow-up work order meant to address the problem that led to the unexpected event. Various email, text, or other application-based alerts may be used to notify specified entities that an unexpected event has occurred. The change management system 107 may also be configured to monitor the time-to-resolution for the unexpected event, and thereby notify entities of how long it took to resolve the problems that led to the unexpected event.

As outlined above, the automation process of generating a workflow to resolve problems or perform other work may be implemented in a modular fashion, and may be comprised of a set of common libraries that can be used across all device models of the same type and specific modules for device model and role combinations. The automation runs a number of concurrent workflows against all device models and role combinations which scales out across multiple sites. The automation triggers a workflow when a device is found to be non-compliant with the current standard.

Automation performed by the change management system 107 manages interaction between various datacenter components. In one embodiment, the components include workflow engine that schedules and executes the code that manages interaction between components, and performs the automated workflows against the individual device components. The datacenter components may further include a configuration management database (CMDB) that stores metadata about datacenter devices. Connection information, current software level, and desired software level are some examples of the types of data retrieved from this source. Another component is a state database (e.g. request State module 121). Through the course of executing automatically run tasks, any data that may be considered valuable for later use or logging may be stored here. The state database also contains the running copy of the work to be performed and its current state.

The change management system 107 is where records of request changes are stored. The change management system provides tracking and insight into the tasks being performed in the environment, and enforces lock out periods. The change management system 107 further allows intervention to start, stop or pause automated workflows that process identified tasks 106. Datacenter devices 120 are the devices that need action, and the automation workflow interacts with these devices to achieve a desired state.

Figure 4:
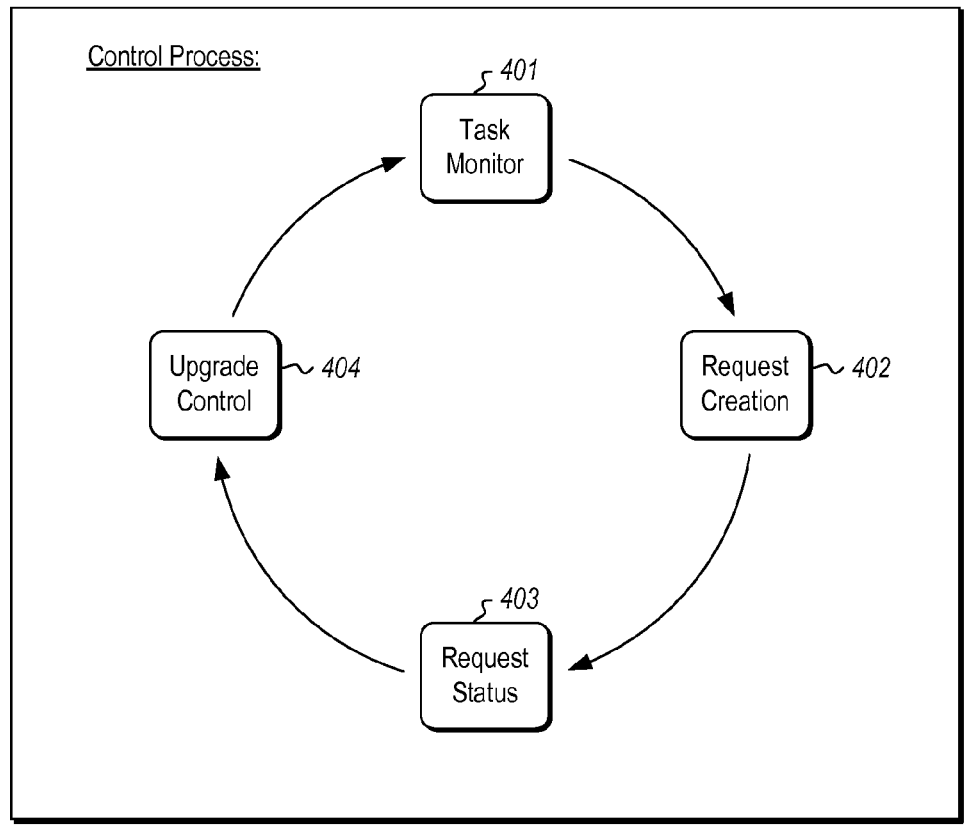
FIG. 4 illustrates an embodiment in which components of a control process are defined.

As shown in FIG. 4, a control process may be provided. The control process is a workflow which triggers other workflows when a datacenter device is found to be non-compliant. The control process runs (at least) four workflows: a task monitor 401, a request creation workflow 402, a request status workflow 403, and a patch control workflow 404. The control process handles the timing and the coordination of the control workflows and records the state in the state database. This ensures that all interactions stay in sync and that the proper number of devices are being upgraded across the sites.

Figure 5:
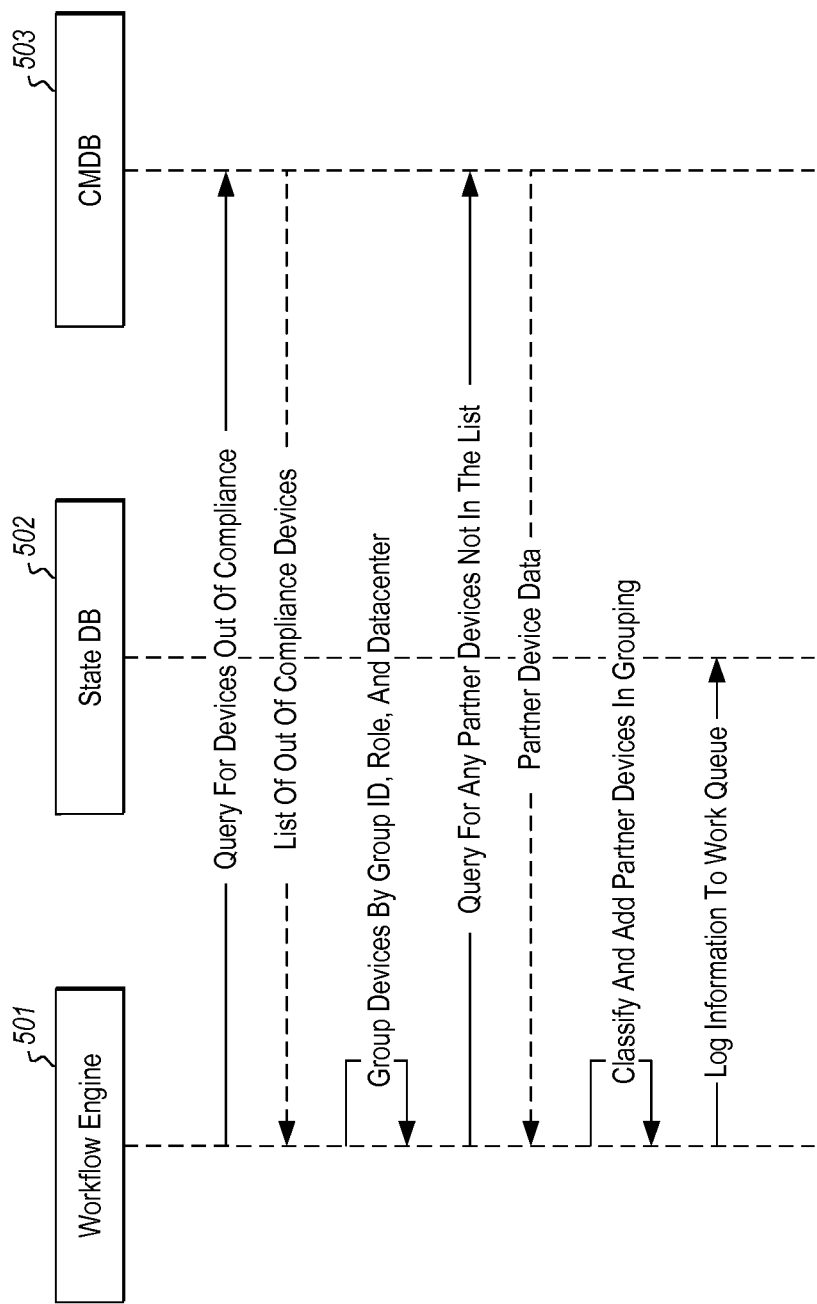
FIG. 5 illustrates an embodiment of a state diagram which describes steps that are taken by various entities.

The first phase of the control process is to look for work that needs to be performed. This is illustrated in FIG. 5. The workflow engine 501 may initiate the process of identifying work that is to be performed by querying the CMDB 503 to find datacenter device role groups that contain members that are out of compliance. These members are then matched to peers and classified by site. This information is recorded in the state database 502 and passed on to the next phase of the process.

Figure 6:
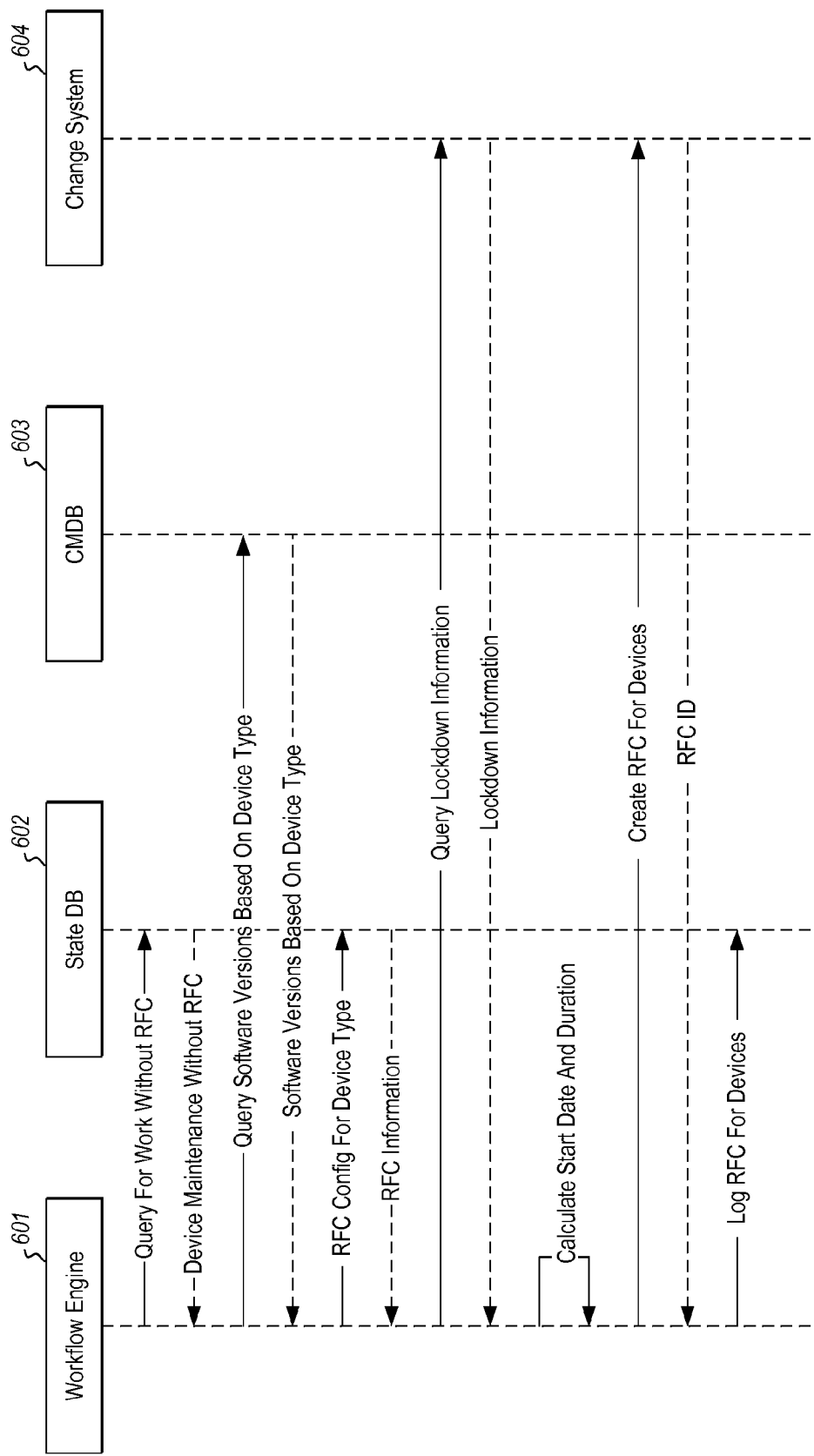
FIG. 6 illustrates an additional embodiment of a state diagram which describes steps that are taken by various entities.

Next, as illustrated in FIG. 6, the request creation workflow (running on workflow engine 601) queries the state database 602 to look for tasks previously recorded by the control workflow that do not have a related request. This phase also queries the CMDB 603 for request-related details such as software versions that will be applied, and category information. Based on the configuration in the state database for the related role and datacenter, an estimated request start time and duration are calculated while avoiding lockdowns. Information regarding existing lockdowns is provided by the change system 604.

Figure 7:
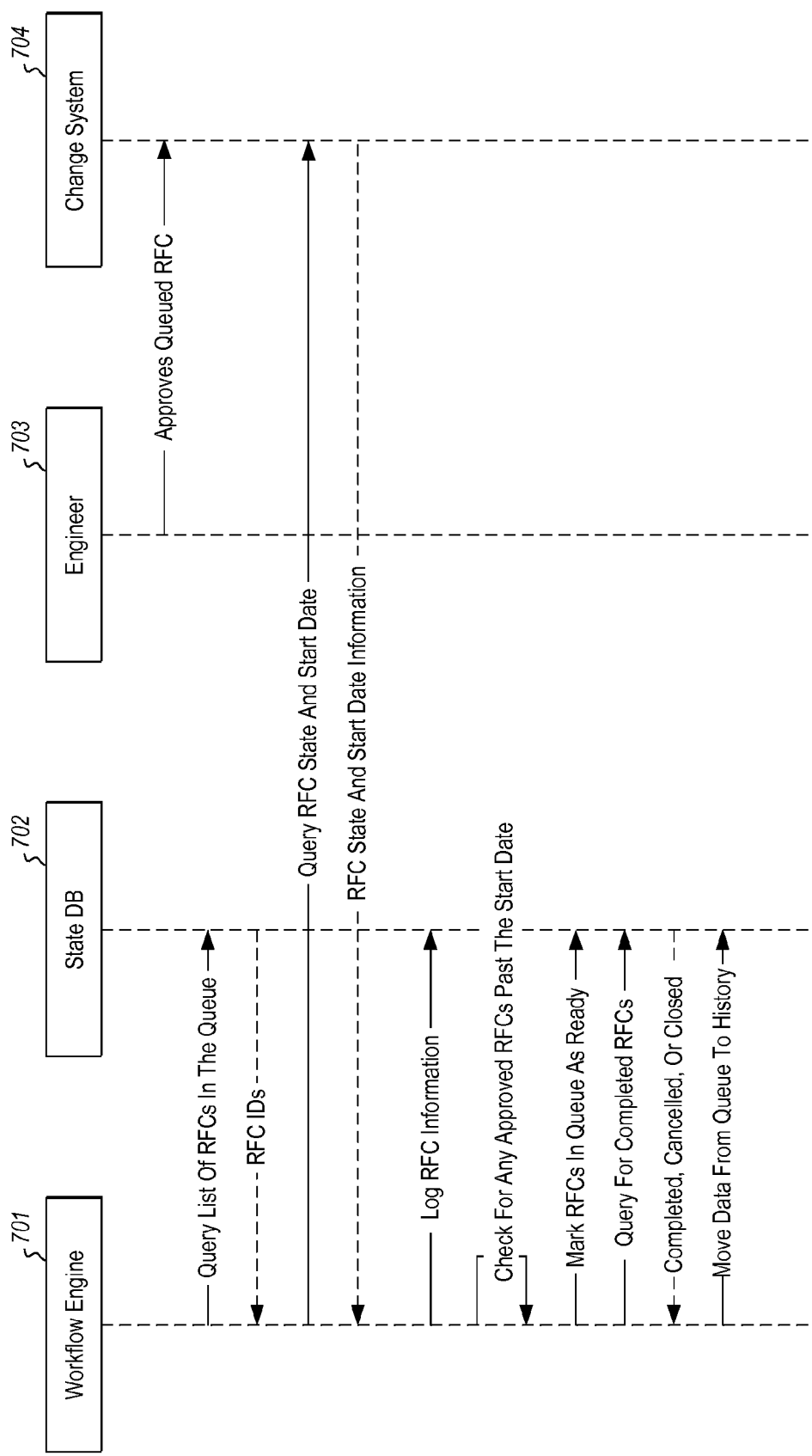
FIG. 7 illustrates an additional embodiment of a state diagram which describes steps that are taken by various entities.

FIG. 7 illustrates the next phase of the control process which moves on to collecting request state information for any requests in the queue of the state database 702. These requests could be in a queued state (as indicated by change system 704), waiting for approval by an engineer 703, or may be currently in progress on the workflow engine 701. Any data for canceled, closed, or completed requests is moved to a history table in the state database 702.

Figure 8:
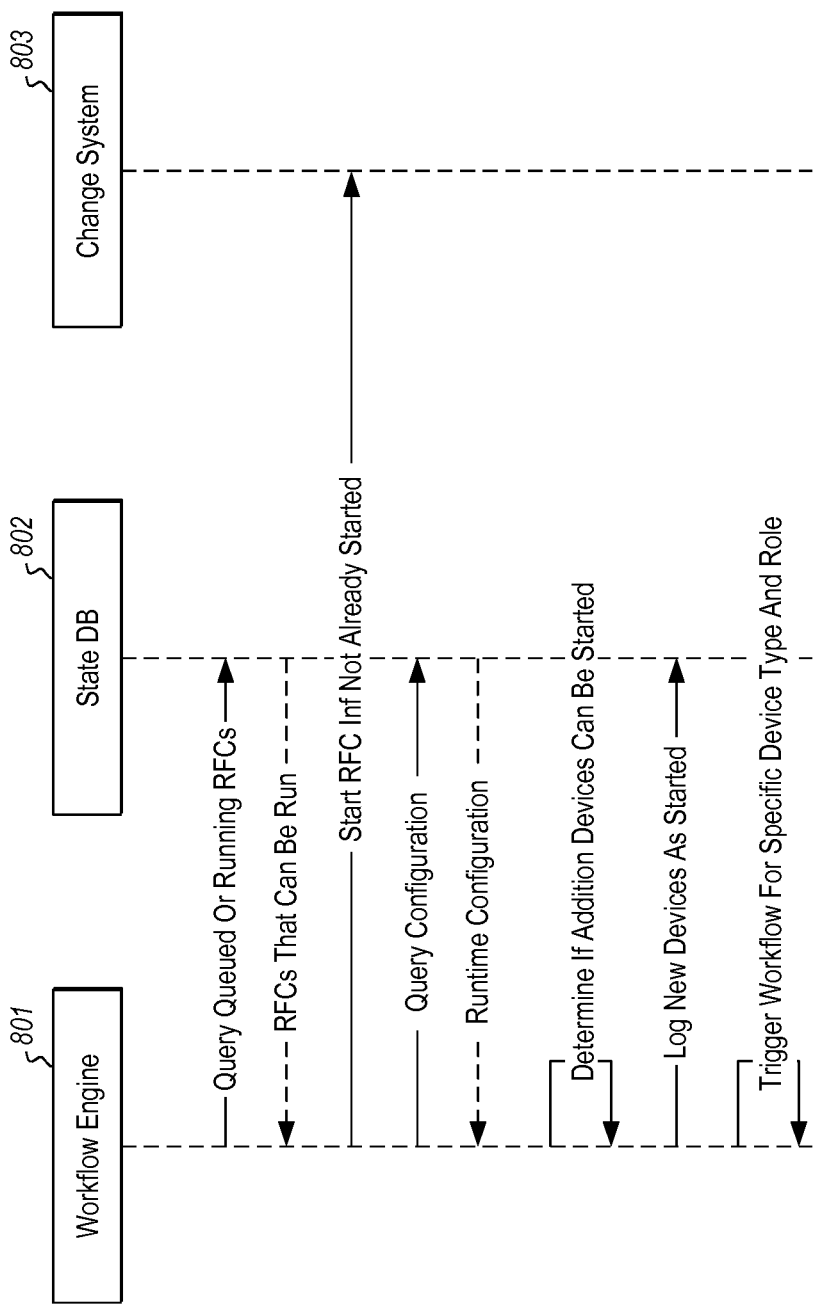
FIG. 8 illustrates an additional embodiment of a state diagram which describes steps that are taken by various entities.

The upgrade control workflow shown in FIG. 8 is the final step in the control process, and coordinates the work being performed. This process begins by checking for request's in the queue that are in a ready or running state, as indicated in the state database 802. The configuration information stored in the state database 802 dictates how many devices can be upgraded simultaneously within a device group, and how many simultaneous device groups per device role. The upgrade control workflow processed by the workflow engine 801 then compares this information to the running states in the queue and determines if new devices can be started.

If the request is paused, no new devices are started regardless of the currently running state. When starting a new device upgrade, the device is matched to the correct workflow based on the device type and role and the change system 803 is notified of the upgrade. The upgrade control workflow also monitors for any failures recorded in the state database 802. If a failure is detected, this indicates that there was an unexpected condition encountered and any additional work for this request is to be stopped until the cause of the failure can be investigated.

Figure 9:
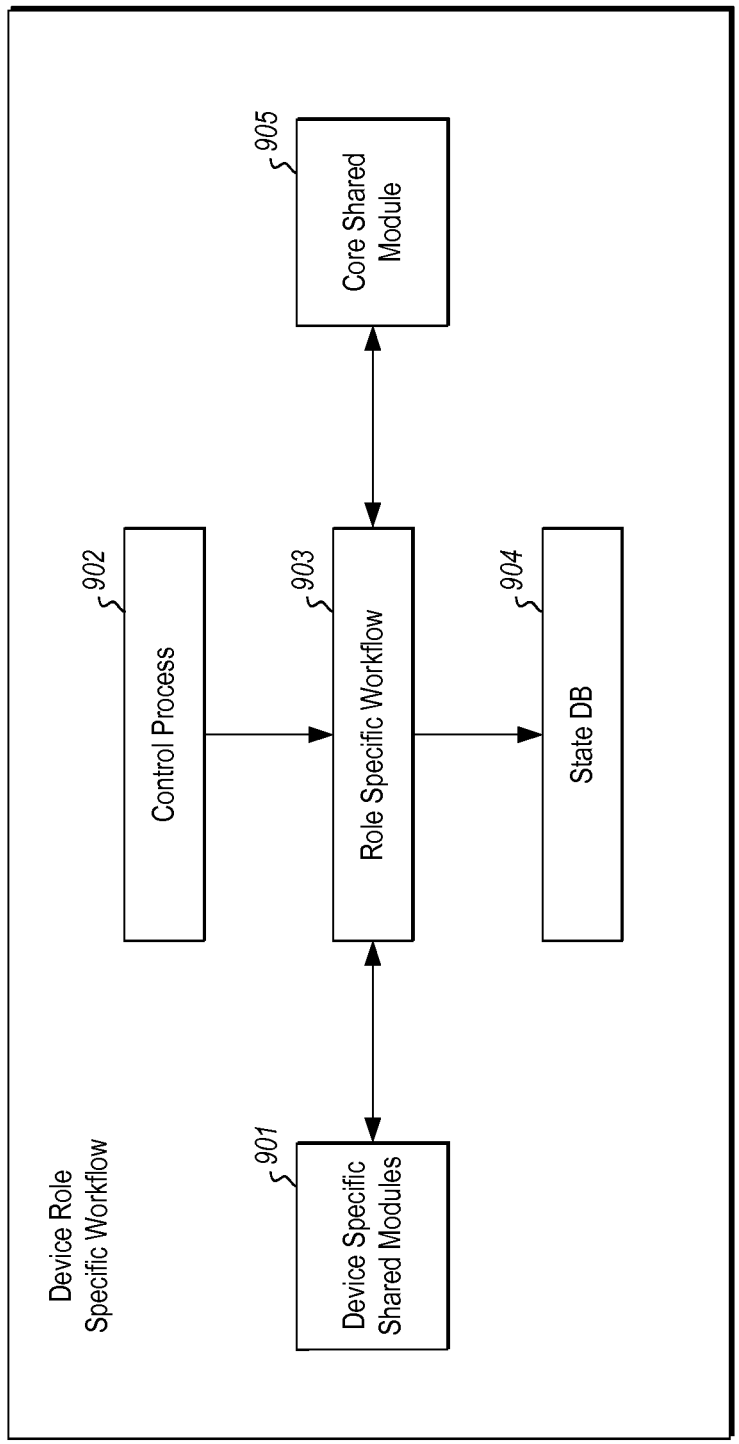
FIG. 9 illustrates an embodiment of a device role specific workflow.

Once a workflow has been triggered by the control process for a specific device, it is the responsibility of that workflow to handle communication back to the state database. As shown in FIG. 9, the role workflow 903 contains the steps and instructions to perform the upgrade for that specific device type and the role it performs in the environment. This logic contains knowledge of the partner devices and how to gracefully perform the upgrade of the device.

Where needed, the device specific role workflow 903 can utilize a shared library of core modules 905 used to interact with common systems that span all device types (i.e. the monitoring system, ticketed, etc.). Since device types can span multiple roles, the role workflow may also call device specific modules 901 that may be shared between roles. Device specific modules may include reusable workflows specific to a particular device operating system and perform common function. For example, installation of an update may be the same for all devices with the same operating system. Role specific workflows are unique to the way in which the specific device is implemented. For example, a device model may be configured as a single entity in a role, but can be configured as fully redundant pair in another role and, as such, would require its own unique instructions for the upgrade process.

Figure 10:
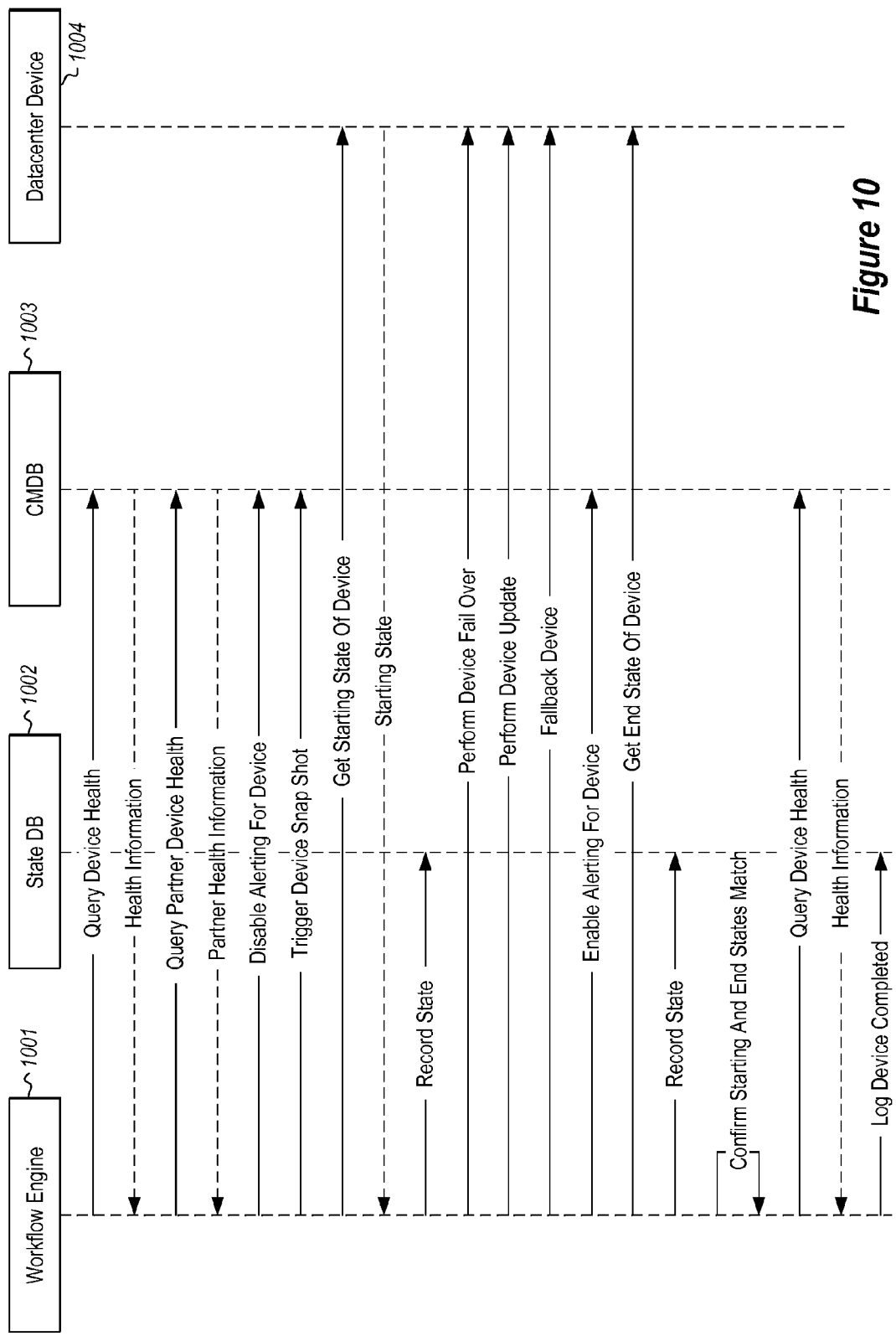
FIG. 10 illustrates an additional embodiment of a state diagram which describes steps that are taken by various entities.

Once complete, the success status is recorded in the state database 904. If there was an error encountered during the upgrade process, this state would also indicate a failure. Failures recorded in this way signal the control process 902 to stop processing other devices for the particular request being executed and allow for manual investigation. FIG. 10 illustrates an example of a role specific workflow in action in which the work engine 1001, the state database 1002, the CMDB 1003 and one or more datacenter devices 1004 interact to ensure that a device upgrade is successfully carried out and properly recorded in the system.

Claims Support: In one embodiment, a method is provided, implemented at a computer system that includes at least one processor, for automatically controlling network and services within a datacenter. The method includes identifying a task 106 that is to be performed within a datacenter 119, creating a request for change 109 that includes an indication of the identified task, the request being stored and managed by a change manager 107, upon creating the request, monitoring processing of the created request, the monitoring resulting in one or more portions of telemetry data 114, analyzing the telemetry data to identify one or more unexpected events 116 related to the processing of the task identified in the request, and upon identifying at least one unexpected event, storing a second request for change generated to address the unexpected event.

The method further includes generating an automation workflow that automatically performs the tasks that are to be performed within the datacenter as specified by the request. The method further includes controlling the automation workflow using the request, such that identified tasks are performed or not performed based on the status of the request. Controlling the automation workflow comprises at least one of stopping the automation workflow, pausing the automation workflow and cancelling the automation workflow using the request.

The method further includes generating the second request for change that addresses the unexpected event, the second request for change including one or more specific tasks that, when processed, handle the unexpected event. The identified task includes performing software or firmware upgrades. In some cases, the method further includes automatically detecting that performance of the identified task has failed, and stopping or pausing the request such that performance of the identified task according to the request will be stopped or paused. The method further includes instantiating a portion of functionality on at least one datacenter device that diverts network traffic off of the datacenter device onto another datacenter device, and reporting the status of the tasks processed as part of the request to at least one entity.

In another embodiment, a computer system is provided which includes at least one processor, a work component 105 configured to identify a task 106 that is to be performed within a datacenter 119, a change management component 107 configured to create a request for change 109 to perform the task, the change management component being configured to store and manage the implementation of requests within the datacenter, a monitoring component 113 that, after determining the request has been created, monitors processing of the request, the monitoring resulting in one or more portions of telemetry data 114, a telemetry component 115 for analyzing the telemetry data to identify one or more unexpected events 116 related to the processing of the request, and a data store 119 for storing, upon identifying at least one unexpected event, a second request for change generated to address the unexpected event, the second request for change including one or more specific tasks that, when processed, handle the unexpected event.

The telemetry data includes at least one of the following: inspection of alert log data, inspection of device status data, inspection of network traffic performance data, time to alert, time to resolution, time to power up device, time to same performance of data or response time to fix. The computer system further generates an indication of expected events prior to implementation of the request for change.

In another embodiment, a computer program product is provided for implementing a method for automatically controlling network and service quality across datacenters, the computer program product comprising one or more computer-readable storage media having stored thereon computer-executable instructions that, when executed by one or more processors of a computing system, cause the computing system to perform the method. The method includes identifying a task 106 that is to be performed within a datacenter 119, accessing a generated request for change 109 that includes an indication of the identified task, the request being stored and managed by a change management service 107, upon accessing the request, monitoring performance of the created request, the monitoring resulting in one or more portions of telemetry data 114, analyzing the telemetry data to identify one or more unexpected events 116 related to the processing of the task identified in the accessed request, upon identifying at least one unexpected event, generating a second request for change to address the unexpected event, and storing the second request for change.

The computer program product further includes, upon identifying the at least one unexpected event, creating an automation workflow that includes one or more automatically implemented tasks that address the unexpected event. Still further, the computer program product includes identifying a time-to-resolution for the unexpected event and monitoring to determine the actual length of time before the unexpected event is resolved.

Accordingly, methods, systems and computer program products are provided which automatically control network and service quality across datacenters and datacenter devices.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for automatically controlling network and services within a datacenter, the method comprising:
   identifying a task that is to be performed within a datacenter;
   creating a request for change that includes an indication of the identified task, the request being stored and managed by a change manager;
   upon creating the request, monitoring processing of the created request, the monitoring resulting in one or more portions of telemetry data;
   analyzing the telemetry data to identify one or more unexpected events related to the processing of the task identified in the request; and
   upon identifying at least one unexpected event, storing a second request for change generated to address the unexpected event.

2. The method of claim 1, further comprising generating an automation workflow that automatically performs the tasks that are to be performed within the datacenter as specified by the request.

3. The method of claim 2, further comprising controlling the automation workflow using the request, such that identified tasks are performed or not performed based on the status of the request.

4. The method of claim 3, wherein controlling the automation workflow comprises at least one of stopping the automation workflow, pausing the automation workflow and cancelling the automation workflow using the request.

5. The method of claim 1, further comprising generating the second request for change that addresses the unexpected event, the second request for change including one or more specific tasks that, when processed, handle the unexpected event.

6. The method of claim 1, wherein the identified task comprises performing software or firmware upgrades.

7. The method of claim 1, further comprising:
   automatically detecting that performance of the identified task has failed; and
   stopping or pausing the request such that performance of the identified task according to the request will be stopped or paused.

8. The method of claim 1, wherein the identified task is performed according to the request in a safe mode that prevents impactful changes.

9. The method of claim 1, wherein the identified task is performed according to the request in an impactful mode that allows impactful changes to occur.

10. The method of claim 1, further comprising instantiating a portion of functionality on at least one datacenter device that diverts network traffic off of the datacenter device onto another datacenter device.

11. The method of claim 1, further comprising reporting the status of the tasks processed as part of the request to at least one entity.

12. The method of claim 1, wherein the identified task comprises upgrading from an older software version to a newer software version.

13. A computer system including:
   at least one processor;
   a work component configured to identify a task that is to be performed within a datacenter;
   a change management component configured to create a request for change to perform the task, the change management component being configured to store and manage the implementation of requests within the datacenter;
   a monitoring component that, after determining the request has been created, monitors processing of the request, the monitoring resulting in one or more portions of telemetry data;
   a telemetry component for analyzing the telemetry data to identify one or more unexpected events related to the processing of the request; and
   a data store for storing, upon identifying at least one unexpected event, a second request for change generated to address the unexpected event, the second request for change including one or more specific tasks that, when processed, handle the unexpected event.

14. The computer system of claim 13, wherein the telemetry data comprises at least one of the following: inspection of alert log data, inspection of device status data, inspection of network traffic performance data, time to alert, time to resolution, time to power up device, time to same performance of data or response time to fix.

15. The computer system of claim 13, further comprising generating an indication of expected events prior to implementation of the request for change.

16. The computer system of claim 13, further comprising generating one or more alerts upon determining that an unexpected event has occurred.

17. The computer system of claim 16, further comprising identifying a time-to-resolution for the unexpected event.

18. A computer program product for implementing a method for automatically controlling network and service quality across datacenters, the computer program product comprising one or more computer-readable storage media having stored thereon computer-executable instructions that, when executed by one or more processors of a computing system, cause the computing system to perform the method, the method comprising:
   identifying a task that is to be performed within a datacenter;
   accessing a generated request for change that includes an indication of the identified task, the request being stored and managed by a change management service;
   upon accessing the request, monitoring performance of the created request, the monitoring resulting in one or more portions of telemetry data;
   analyzing the telemetry data to identify one or more unexpected events related to the processing of the task identified in the accessed request;
   upon identifying at least one unexpected event, generating a second request for change to address the unexpected event; and
   storing the second request for change.

19. The computer program product of claim 17, further comprising, upon identifying the at least one unexpected event, creating an automation workflow that includes one or more automatically implemented tasks that address the unexpected event.

20. The computer program product of claim 17, further comprising identifying a time-to-resolution for the unexpected event and monitoring to determine the actual length of time before the unexpected event is resolved.

* * * * *